United States Patent [19]

Leo et al.

[11] Patent Number: 4,749,164
[45] Date of Patent: Jun. 7, 1988

[54] SHOCK AND VIBRATION ISOLATION LOCKING SYSTEM

[75] Inventors: Cosmo L. Leo, Waltham; Stanley W. Stefanick, Uxbridge, both of Mass.

[73] Assignee: Digital Equipment Corporation, Maynard, Mass.

[21] Appl. No.: 29,331

[22] Filed: Mar. 23, 1987

[51] Int. Cl.$^4$ ............................................. F16M 13/00
[52] U.S. Cl. ................................... 248/674; 248/27.3
[58] Field of Search ............... 248/544, 637, 674, 675, 248/27.1, 27.3, 200, 201, 302, 456; 292/212, 342; 312/319

[56] References Cited

U.S. PATENT DOCUMENTS

| | | | |
|---|---|---|---|
| 554,317 | 2/1896 | Schwarz | 292/342 |
| 756,486 | 4/1904 | Fleming | 248/456 |
| 1,352,456 | 9/1920 | Guynn | 292/342 |
| 1,428,500 | 9/1922 | Buedingen | 248/302 |
| 1,942,340 | 1/1934 | Madden | 248/456 |
| 2,496,938 | 2/1950 | Friedman | 248/27.3 |
| 2,790,961 | 4/1957 | Del Camp | 248/27.3 |
| 3,211,402 | 10/1965 | Hayter | 248/27.3 |
| 3,273,951 | 9/1966 | Miller | 312/319 |
| 3,278,145 | 10/1966 | Leshuk | 248/27.3 |
| 3,394,909 | 7/1968 | Di Pilla | 248/27.3 |
| 3,613,177 | 10/1971 | Davis | 248/27.3 |
| 4,467,727 | 8/1984 | Strommer | 248/456 |
| 4,546,850 | 10/1985 | Litner | 248/27.3 |
| 4,577,818 | 3/1986 | Clarisse | 248/27.3 |
| 4,618,119 | 10/1986 | Powell | 248/456 |

Primary Examiner—J. Franklin Foss
Assistant Examiner—Robert A. Olson
Attorney, Agent, or Firm—Hayes, Davis & Soloway

[57] ABSTRACT

In a shock and vibration isolation system wherein a device having a top, bottom, sides, front and back is mounted on moving isolators between and in spaced relationship to top and bottom members, front operable locking apparatus for releasably holding the device in place against vertical, lateral and longitudinal movement during shipping. A top releasable locking assembly is disposed between the top member and the device and a bottom releasable locking assembly is disposed between the bottom member and the device. Each releasable locking assembly includes a first pivot bar pivotally mounted to the adjacent member and extending perpendicular to and between the sides of the device. An operating arm is attached to one end of the first pivot bar at right angles thereto and disposed so as to pivot in a plane close adjacent and parallel to the side of the device at the end between a first position lying along the adjacent member and a second position angularly disposed with respect to the adjacent member. A threaded bolt is carried by the adjacent member at the front of the device for releasably holding the operating arm in the first position. A first locking assembly is carried by the first pivot bar and includes locking projections having horizontal stabilizing bars for entering into locking relationship with the device to hold it from movement when the operating arm is in the first position and for moving out of locking relationship with the device to allow metal movement thereof when the operating arm is moved to the second position. Finally, a bias spring is operably connected to urge the operating arm towards the second position whereby when the locking apparatus is released following shipment the device will be unlocked for normal movement.

17 Claims, 4 Drawing Sheets

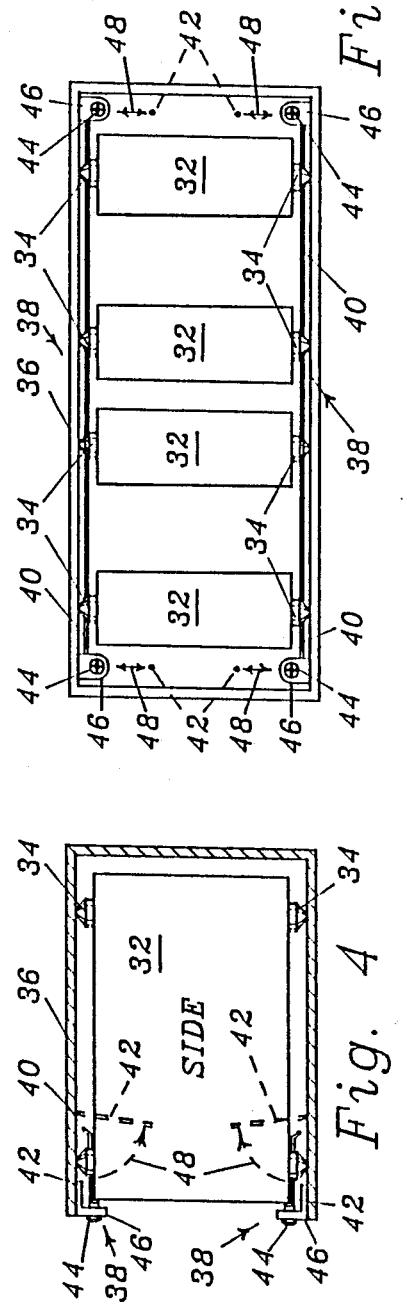
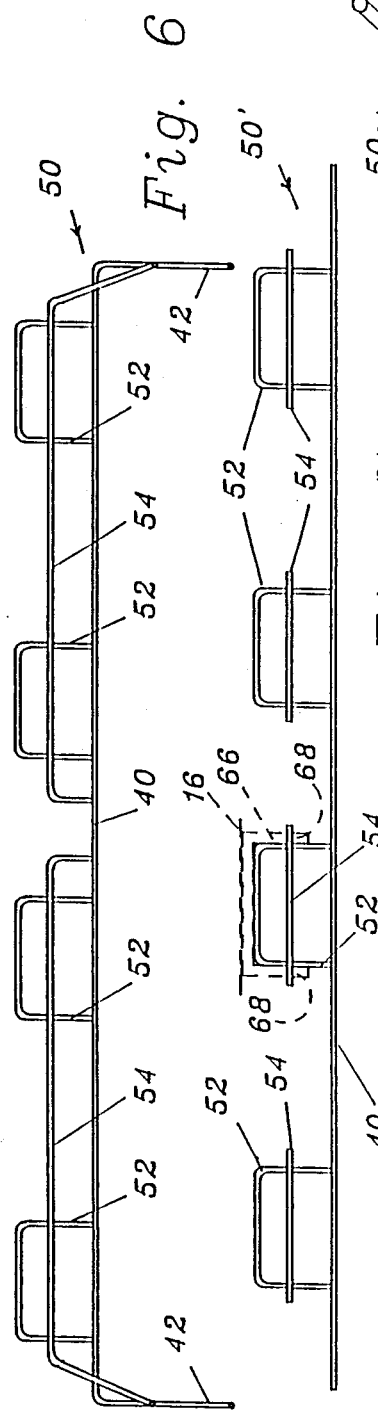
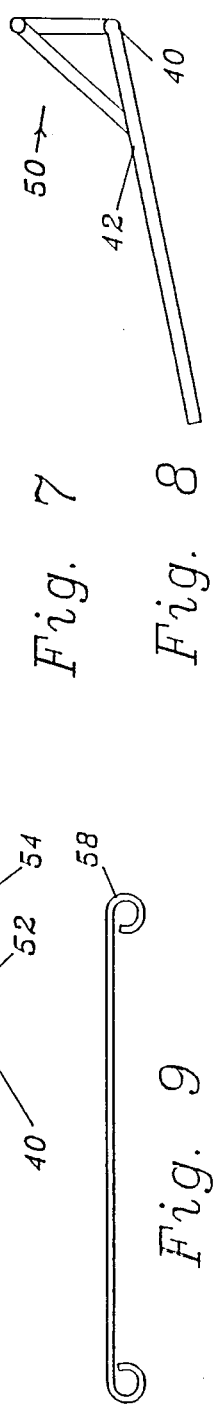

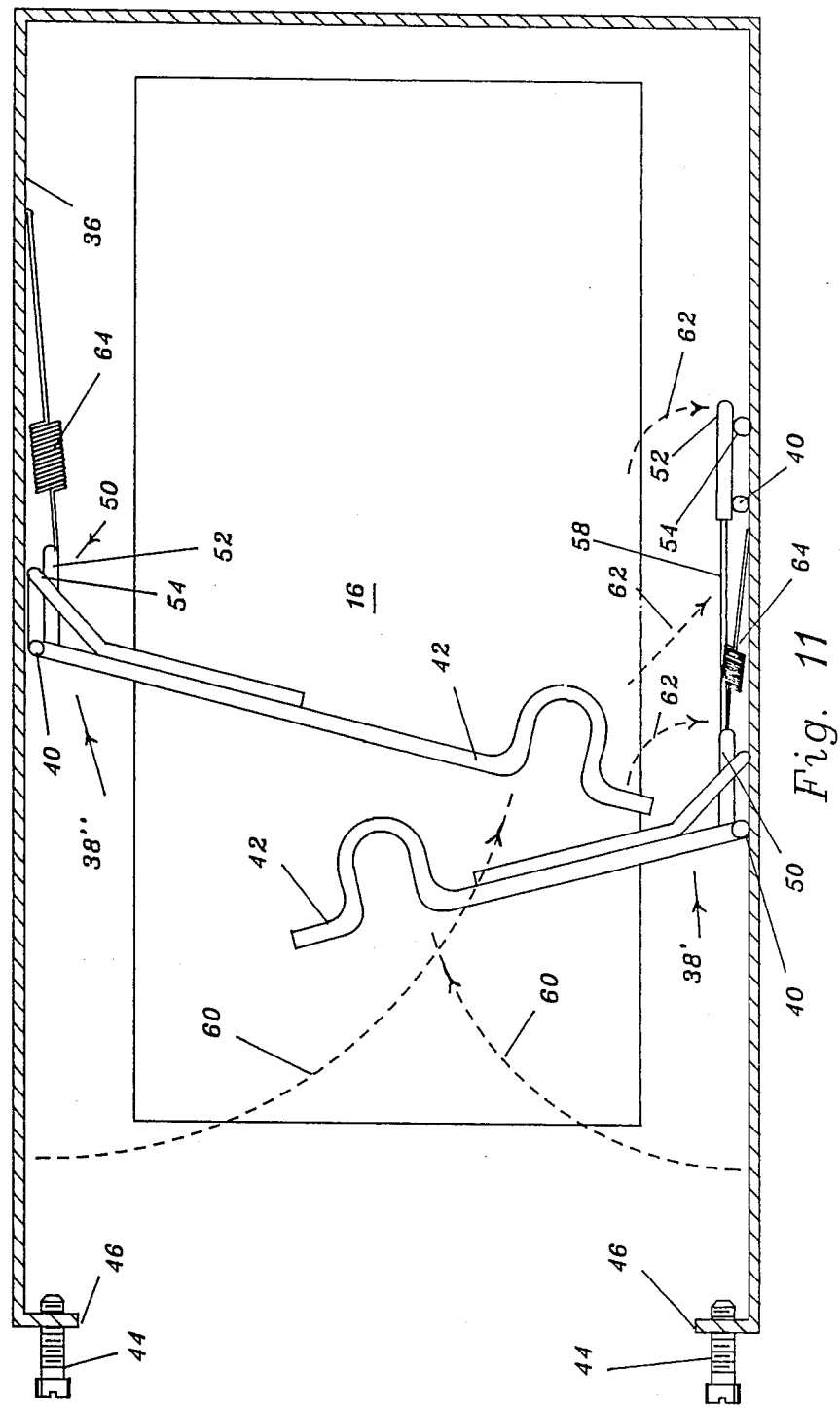

SHOCK AND VIBRATION ISOLATION LOCKING SYSTEM

BACKGROUND OF THE INVENTION

The present invention relates to shock and vibration isolation systems and, more particularly in a shock and vibration isolation system wherein a device having a top, bottom, sides, front and back is mounted on moving isolators in spaced relationship to a member, to front operable locking apparatus for releasably holding the device in place against vertical, lateral and longitudinal movement during shipping comprising, a first pivot bar pivotally mounted to the member and extending perpendicular to and between the sides of the device; an operating arm attached to one end of the first pivot bar at right angles thereto and disposed so as to pivot in a plane close adjacent and parallel to the side of the device at that end between a first position lying along the member and a second position angularly disposed with respect to the member; means carried by the member adjacent the front of the device and accessible therefrom for releasably holding the operating arm in the first position; first locking means carried by the first pivot bar and including locking projections having stabilizing bars thereon for entering into locking relationship with the device to hold it from movement when the operating arm as in the first position and for moving out of locking relationship with the device to allow normal movement thereof when the operating arm is moved to the second position; and, spring bias means operably connected to urge the operating arm towards the second position whereby when the releasable holding means is released following shipment the device will be unlocked for normal movement.

Larger, commercial sized computers, such as that indicated as 10 in FIG. 1, typically include a mass storage device 12, such as a disk drive, therein. If the device 12 is hard mounted to the chassis of the computer 10, shocks and vibrations which enter the computer 10 pass directly into the device 12. In an effort to protect the storage device 12, shock and vibration isolation mounting, such as that indicated as 14, may be employed. Such isolation systems are used in a variety of things well known in the art from record turntables to washing machines. Also well known in the art is that where an isolation system is used, typically some sort of bracing must be employed to prevent movement during shipment. As indicated by the simplified drawing of FIG. 2, the isolation system usually allows movement of the protected and isolated device 16 in three directions—vertical, as indicated by the arrow 18; lateral (i.e. side to side), as indicated by the arrow 20; and longitudinal (i.e. front to back), as indicated by the arrow 22. In a device as simple as a record turntable, the shipping bracing may simply comprise a wad of cardboard jammed between moving parts which is removed before use. Several so-called "CD" or compact disk players have an externally accessible locking cam for shipping which can be set or released with a screwdriver without having to open the case. Many "hard drives" as employed with personal computers have a software activated "park" position wherein the moving heads are withdrawn into a safe position for shipment.

Larger and heavier devices usually employ more specialized and heavy duty shipping blocks. Several prior art approaches are shown in FIG. 3 and include foam shipping blocks 24, special shipping braces 25 bolted between the device 16 and the surrounding cabinet 26, shipping bars 28 passing through holes provided therefore in the device 16 and cabinet 26, and wedges 30.

In our co-pending application Ser. No. 29328, filed Mar. 23, 1987 entitled SHOCK AND VIBRATION ISOLATION MOUNTING, is now U.S. Pat. No. 4,705,257 issued Nov. 10, 1987 which is assigned to the common assignee of this application, we described novel apparatus for shock and vibration isolation of computer disk drives, and the like, which allows insertion and removal of the disk drive with access through the computer cabinet from only one side. The apparatus, as shown in simplified form in FIGS. 4 and 5, suspends the disk drives 32 between upper and lower elastomeric isolators 34 which are in tension and compression, respectively. As can be appreciated from a consideration of the prior art shipping block options of FIG. 3 in combination with the movements possible as shown in FIG. 2, it is impossible to insert and remove any of the prior art apparatus of FIG. 3 to stop movement in all three axes shown in FIG. 2 with access from only one side. Additionally, virtually all of the prior art shipping block systems employ parts which must be removed and stored in the event of later re-shipment. Usually, when unexpected reshipment is required, the shipping materials have been discarded or are stored in a "safe" place, which nobody remembers.

Wherefore, it is an object of the present invention to provide a shock and vibration isolation locking system for use during shipping which will prevent movement in all directions but which can be activated and released with access from only one side.

It is a further object of the present invention to provide a shock and vibration isolation locking system for use during shipping which remains associated with the device during normal use so as to require no separate storage and to be readily available for use at any time the device is moved for any reason wherein extraordinary shocks and vibrations could be encountered.

SUMMARY

The foregoing objects are achieved in a shock and vibration isolation system wherein a device having a top, bottom, sides, front and back is mounted on moving isolators between and in spaced relationship to top and bottom members, by the front operable locking apparatus of the present invention for releasably holding the device in place against vertical, lateral and longitudinal movement during shipping comprising, a top releasable locking assembly disposed between the top member and the device and a bottom releasable locking assembly disposed between the bottom member and the device. Each releasable locking assembly includes a first pivot bar pivotally mounted to the adjacent member and extending perpendicular to and between the sides of the device. An operating arm is attached to one end of the first pivot bar at right angles thereto and disposed so as to pivot in a plane close adjacent and parallel to the side of the device at the end between a first position lying along the adjacent member and a second position angularly disposed with respect to the adjacent member. A threaded bolt is carried by the adjacent member at the front of the device for releasably holding the operating arm in the first position. First locking means are carried by the first pivot bar and include locking projections having stabilizing bars thereon for entering into locking relationship with the device to hold it from movement when the operating arm is in the first position and for moving out of locking relationship with the device to allow normal movement thereof when the operating arm is moved to the second position. Finally, spring bias means are operably connected to urge the operating arm towards the second position whereby when the releasable holding means is released following shipment, the device will be unlocked for normal movement.

In the preferred embodiment, the locking apparatus additionally comprises the bottom releasable locking assembly including a second pivot bar pivotally mounted to the adjacent member spaced from the first pivot bar and extending perpendicular to and between the sides of the device; second locking means carried by the second pivot bar and including locking projections having stabilizing bars thereon for entering into locking relationship with the device to hold it from movement when the operating arm is in the first position and for moving out of locking relationship with the device to allow normal movement thereof when the operating arm is moved to the second position; and, connecting means operably interconnecting the first and second locking means whereby to have them move in combination.

DESCRIPTION OF THE DRAWINGS

FIG. 4 is a simplified side view of a shock and vibration isolation mounting system according to our copending application showing the manner of operation of the present invention in conjunction therewith.

FIG. 5 is a simplified front view of the shock and vibration isolation mounting system of FIG. 4 showing the manner of operation of the present invention in conjunction therewith.

FIG. 6 is a front view of the operating portion of the present invention.

FIG. 7 is a front view of the auxiliary operating portion of the present invention showing the manner in which the locking of the device during shipment is affected thereby.

FIG. 8 is a side view of the apparatus of FIG. 6.

FIG. 9 is a side view of the connecting link used to operably connect the operating portions of FIG. 7 and 8 to affect combined operation thereof.

FIG. 11 is a detailed side view of the present invention in its unlocked for normal use position.

DESCRIPTION OF THE PREFERRED EMBODIMENT

Figure 2:
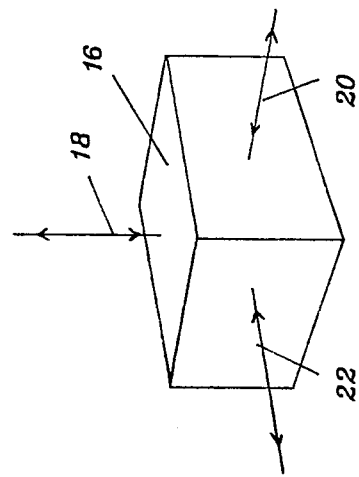
FIG. 2 is a simplified drawing showing the various movements possible with an isolation mounting system which must be blocked during shipment.
Figure 1:
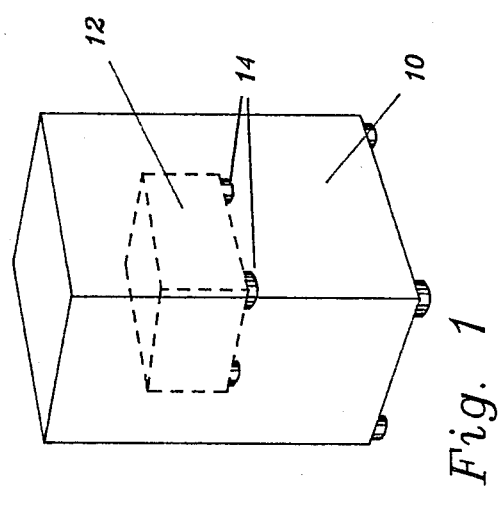
FIG. 1 is a simplified perspective drawing of a computer having a mass storage device mounted therein on isolation mountings.
Figure 3:
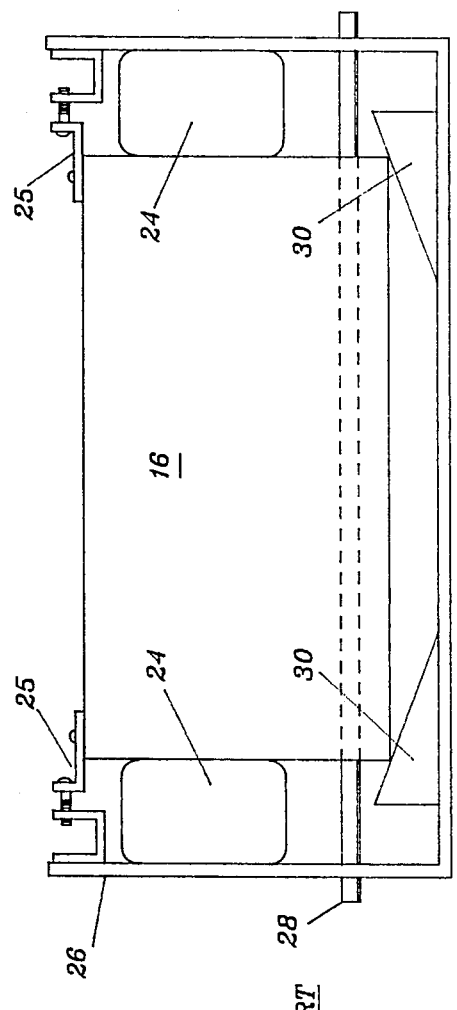
FIG. 3 is a simplified front view showing various prior art techniques for blocking or preventing movement of an isolation-mounted device during shipment.

The present invention is shown in simplified form in FIGS. 4 and 5. As previously mentioned in our copending shock and vibration isolation system, a device 16 having a top, bottom, sides, front and back is mounted between top and bottom elastomeric isolators 34 disposed between the device 16 and an adjacent computer chassis member 36. Front operable locking apparatus according to the present invention, generally indicated as 38, is used at the top and bottom for releasably holding the device 16 in place against vertical, lateral and longitudinal movement during shipping. Each of the locking apparatus includes a pivot bar 40 pivotally mounted to the adjacent member 36 and extending perpendicular to and between the sides of the device 16. Where two or more devices 16 are mounted side by side as shown in FIG. 5, a single locking apparatus 38 can be used for all the devices to lock them and unlock them simultaneously. In such case, the pivot bar 40 extends between the two outermost sides of the devices 16. In the preferred embodiment, an operating arm 42 is attached to each end of the pivot bar 40 at right angles thereto and disposed so as to pivot in a plane close adjacent and parallel to the side of the device 16 at the ends between a first position lying along the member 36, as shown in solid FIGS. 4 and 5, and a second position angularly disposed with respect to the member 36, as shown ghosted therein. A bolt 44 threaded through a tab 46 adjacent the front of the device 16 is used to releasably hold the operating arm 42 in the first position. Locking means (not yet shown but to be described in detail shortly) are carried by the pivot bar 40 and include locking projections having horizontal stabilizing bars. The projections and stabilizing bars are urged into locking relationship with the device 16 to hold it from movement when the operating arm 42 is in the first position. The locking projections are moved out of locking relationship with the device 16 to allow normal movement thereof when the operating arm 42 is moved to the second position as indicated by the arrows 48 in FIGS. 4 and 5. Spring bias means (not shown) are operably connected to urge the operating arm 42 towards the second position whereby when the locking apparatus 38 is released following shipment by unscrewing the bolts 44, the device 16 is automatically unlocked for normal movement. The above-described apparatus, of course, stays safely out of the way in the second position where it is instantly and readily available for use in locking the device 16 for shipment or movement if needed. To relock the device 16, the operating arms 42 are simply moved to the first position and held in place by screwing the threaded bolts 44 into engagement therewith. The apparatus of the present invention will now be described in more detail.

While those skilled in the art will recognize that the components of the present invention could be constructed of different materials to obtain the same results and benefits, the applicants herein found that adequate operation coupled with ease of manufacture, lightweight, and non-restriction of airflow was obtained through the use of formed wire for most of the apparatus to be described. Assembly thereof was easily accomplished with standard techniques such as spot welding after bending of the wire into the desired shape on a jig made for the purpose. Preferred operation was obtained through the use of a bottom assembly having two points of locking contact disposed in front and behind one another and a top assembly having one point of locking contact between the two of the bottom assembly. This is best seen with initial reference to FIG. 10 wherein the bottom locking apparatus is generally indicated as 38' and the top locking apparatus is generally indicated as 38''.

Figure 10:
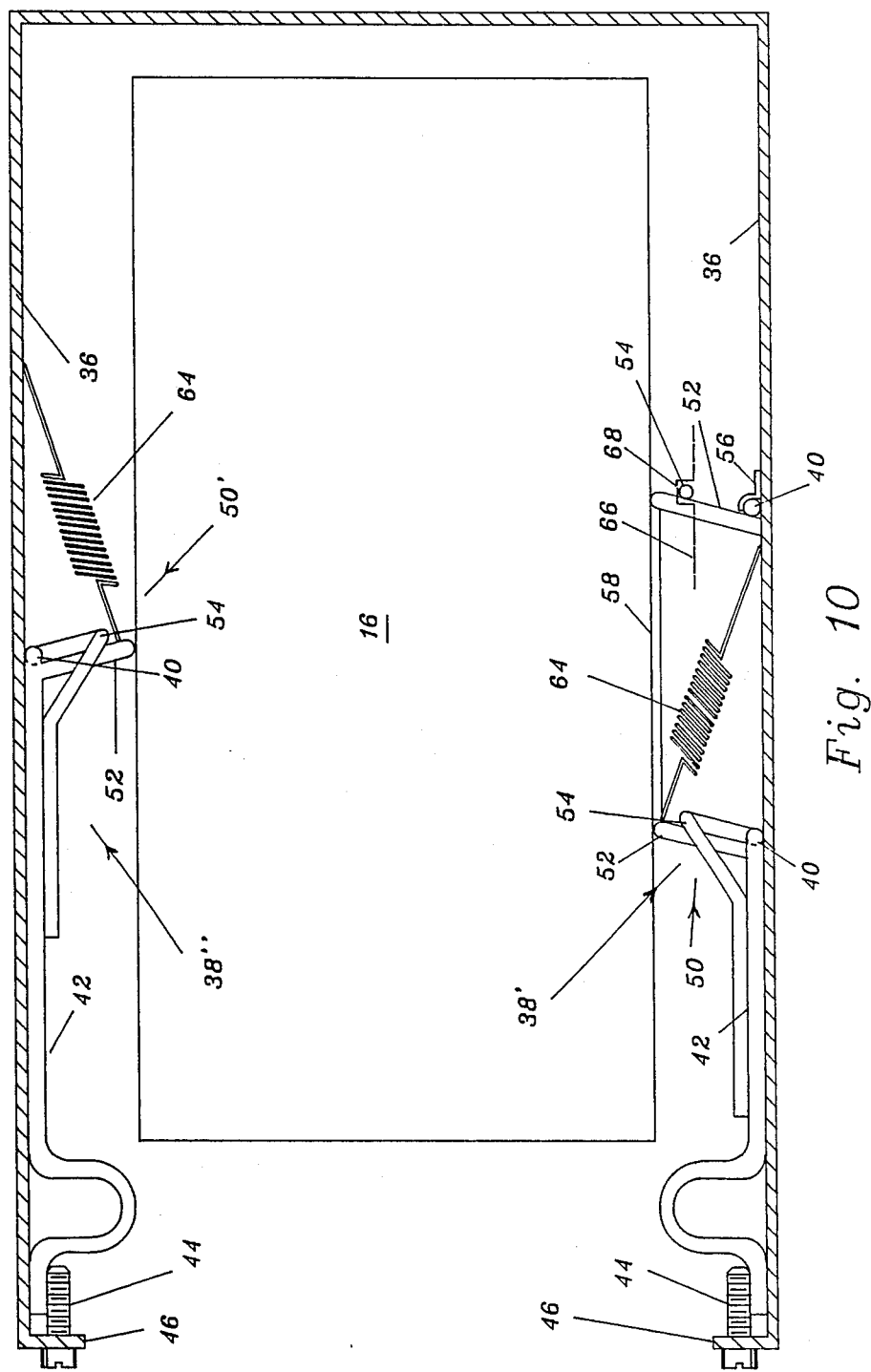
FIG. 10 is a detailed side view of the present invention in its locked for shipment position.

The bottom locking apparatus 38' employs a composite operating bar 50, as shown in FIGS. 6 and 8, which includes the pivot bar 40, the operating arm 42 and the locking projections 52 attached thereto. The locking projections 52 also have stabilizing bars 54 horizontally attached thereto. Additionally, there is an auxiliary operating bar 50', as shown in FIG. 7 which is also a composite bar including the components described above for the bar 50 but eliminating the operating arm 42. The pivot bars 40 are pivotally attached to the adjacent chassis member 36 by any of several ways well known in the art which form no part of the present invention such as curved clips 56, or the like, as shown in FIG. 10. In the bottom locking apparatus 38', a pair of the locking projections 52 on respective ones of the bars 50, 50' are operably interconnected with a connecting link 58 of strap metal, or the like, as shown in FIG. 9 so as to move in combination between the first (i.e. locked) position of FIG. 10 and the second (i.e. unlocked) position of FIG. 11.

The top locking apparatus 38" employs only the composite operating bar 50 described above and shown in FIGS. 6 and 8, which includes the pivot bar 40, the operating arm 42 and the locking projections 52. To hold the operating arms 42 in the first position, the adjacent chassis member 36 has a tab 46 formed therein through which the threaded bolt 44 is screwed. As shown in FIG. 10, when the bolt 44 is screwed all the way into the tab 46 with the operating arm 42 in the first position, the operating arm 42 is firmly wedged and held between the bolt 44 and the adjacent member 36. When the bolts 44 are unscrewed to the retracted position of FIG. 11, the operating arms 42 swing to the second position as indicated by the dotted arrows 60 causing the locking projections 52 to swing out of locking engagement as indicated by the dotted arrows 62.

To affect automatic unlocking and to hold the locking apparatus 38', 38" in its unlocked position during non-use, a coil spring 64 is connected between one of the locking projections 52 and the adjacent chassis member 36 as shown in FIGS. 10 and 11. Spring 64 is a bias spring which urges the apparatus 38', 38", in each case, towards its unlocked position.

To obtain the desired locking in the various directions, the locking projections 52 and horizontal stabilizing bars 54 are formed to interface with channels or other projections of the device 16 or its isolation mounting system, shown ghosted as 66, as indicated in FIGS. 7 and 11. Vertical movement is prevented by the opposed wedging forces of the locking apparatus 38', 38". Lateral and longitudinal movement is prevented by frictional bearing of the locking projections 54 against the device 16 or mounting system 66 and/or the bearing of the locking projections 54 against some outward facing projection such as the sides of the channel as in FIG. 7. In the preferred embodiment as incorporated into commercial computers as manufactured by the assignee of the present application the stabilizing bars 54 fit into slots, such as at 68 in FIG. 11, in the mounting system of the disk drive thus providing secure resistance to any and all lateral and longitudinal movements. As will be appreciated by those skilled in the art, while designed primarily for use in conjunction with the isolation mounting system of our above-referenced copending appilcation, the locking apparatus of the present invention could also be employed with other isolation mounting systems as employed in other devices.

Thus, from the foregoing description it can be seen that the present invention has truly met it stated objects by providing a locking system for a shock and vibration isolation mounting system which is lightweight, efficient, self-storing and operable with access from only one side.

Wherefore, having thus described our invention, we claim:

1. In an assembly including a device and a shock and vibration isolation system therefor wherein the device has a top, bottom, sides, front and back and is mounted on isolators in spaced relationship to a support therefor and locking apparatus is provided for releasably holding the device in place against vertical, lateral and longitudinal movement during shipping, the improvement comprising:
    (a) a first pivot bar pivotally mounted to the support and extending perpendicular to and between the sides of the device;
    (b) an operating arm carried by one end of said first pivot bar at right angles thereto and disposed so as to pivot in a plane close adjacent and parallel to the side of the device at said end between a first position lying along the member and a second position angularly disposed with respect to said member;
    (c) means carried by the support adjacent the front of the device and accessible therefrom for releasably holding said operating arm in said first position;
    (d) first locking means carried by said first pivot bar and including locking projections for urging said locking projections into locking relationship with the device to hold it from movement when said operating arm is in said first position and for moving said locking projections out of locking relationship with the device to allow normal movement thereof when said operating arm is moved to said second position; and,
    (e) spring bias means operably connected to urge said operating arm towards said second position whereby when said releasable holding means is released following shipment the device will be unlocked for normal movement.

2. The assembly of claim 1 wherein:
    said locking projections include horizontal stabilizing bars for engaging mating slots provided in the device therefor.

3. The assembly of claim 1 and additionally comprising:
    a second operating arm carried by the other end of said first pivot bar at right angles thereto and disposed so as to pivot in a plane close adjacent and parallel to the side of the device at said other end between a first position lying along the member and a second position angularly disposed with respect to said member.

4. The assembly of claim 1 wherein:
    said means for releasably holding said operating arm in said first position comprises a bolt threadably inserted into a tab carried by the support and positioned such that with said operating arm disposed against the support and said bolt threaded into said tab said operating arm is trapped between the support and said bolt.

5. The assembly of claim 1 and additionally comprising:
    (a) a second pivot bar pivotally mounted to the support spaced from said first pivot bar and extending perpendicular to and between the sides of the device;
    (b) second locking means carried by said second pivot bar and including locking projections for urging said locking projections into locking relationship with the device to hold it from movement when said operating arm is in said first position and for moving said locking projections out of locking relationship with device to allow normal movement thereof when said operating arm is moved to said second position; and (c) connecting means operably interconnecting said first and second locking means whereby to have them move in combination.

6. The assembly of claim 5 wherein:
said locking projections of said second locking means include horizontal stabilizing bars for engaging mating slots provided in the device therefor.

7. In an assembly including a device and a shock and vibration isolation system therefor wherein the device has a top, bottom, sides, front and back and is mounted on isolators between and in spaced relationship to top and bottom supports therefor and locking apparatus is provided for releasably holding the device in place against vertical, lateral and longitidinal movement during shipping, the improvement comprising:

a top releasable locking assembly disposed between the top support and the device and a bottom releasable locking assembly disposed between the bottom support and the device, wherein each releasable locking assembly comprises:

(a) a first pivot bar pivotally mounted to the adjacent support and extending perpendicular to and between the sides of the device;

(b) an operating arm carried by one end of said first pivot bar at right angles thereto and disposed so as to pivot in a plane close adjacent and parallel to the side of the device at said end between a first position lying along the adjacent support and a second position angularly disposed with respect to said adjacent support;

(c) means carried by the adjacent support adjacent the front of the device and accessible therefrom for releasably holding said operating arm in said first position;

(d) first locking means carried by said first pivot bar and including locking projections for urging said locking projections into locking relationship with the device to hold it from movement when said operating arm is in said first position and for moving said locking projections out of locking relationship with the device to allow normal movement thereof when said operating arm is moved to said second position; and (e) spring bias means operably connected to urge said operating arm towards said second position whereby when said releasable holding means is released following shipment the device will be unlocked for normal movement.

8. The assembly of claim 7 wherein:
said locking projections include horizontal stabilizing bars for engaging mating slots provided in the device therefor.

9. The assembly of claim 7 and additionally comprising;
a second operating arm carried by the other end of said first pivot bar at right angles thereto and disposed so as to pivot in a plane close adjacent and parallel to the side of the device at said other end between a first position lying along the adjacent support and a second position angularly disposed with respect to said support.

10. The assembly of claim 7 wherein:
said means for releasably holding said operating arm in said first position comprises a bolt threadably inserted into a tab carried by the adjacent support and positioned such that with said operating arm disposed against said support and said bolt threaded into said tab said operating arm is trapped between said support and said bolt.

11. The assembly of claim 7 and additionally comprising the bottom releasable locking assembly including;

(a) a second pivot bar pivotally mounted to the adjacent support spaced from said first pivot bar and extending perpendicular to and between the sides of the device;

(b) second locking means carried by said second pivot bar and including locking projections for urging said locking projections into locking relationship with the device to hold it from movement when said operating arm is in said first position and for moving said locking projections out of locking relationship with the device to allow normal movement thereof when said operating arm is moved to said second position; and, (c) connecting means operably interconnecting said first and second locking means whereby to have them move in combination.

12. The assembly of claim 11 wherein:
said second locking projections include horizontal stabilizing bars for engaging mating slots provided in the device therefor.

13. In an assembly including a device and means for releasably holding said device in place against vertical, lateral and longitudinal movement during shipping and a shock and vibration isolation mounting for said device having a top, bottom, sides, front and back within an enclosure in which it is mounted between upper and lower supports, said apparatus comprising:

(a) a first pivot bar pivotally mounted to the upper support and extending perpendicular to and between the sides of the device;

(b) a first operating arm carried by one end of said first pivot bar at right angles thereto and disposed so as to pivot in a plane close adjacent and parallel to the side of the device at said end between a first position lying along the upper support and a second position angularly disposed with respect to said upper support;

(c) first means carried by the upper support adjacent the front of the device and accessible therefrom for releasably holding said first operating arm in said first position;

(d) first locking means carried by said first pivot bar and including locking projections for urging said locking projections into locking relationship with the device to hold it from movement when said first operating arm is in said first position and for moving said locking projections out of locking relationship with the device to allow normal movement thereof when said first operating arm is moved to said second position;

(e) first spring bias means operably connected to urge said first operating arm towards said second position;

(f) a second pivot bar pivotally mounted to the lower support and extending perpendicular to and between the sides of the device;

(g) a second operating arm carried by one end of said second pivot bar at right angles thereto and disposed so as to pivot in a plane close adjacent and parallel to the side of the device at said end between a first position lying along the lower support and a second position angularly diposed with respect to said lower support;

(h) second means carried by the lower support adjacent the front of the device and accessible therefrom for releasably holding said second operating arm in said first position;

(i) second locking means carried by said second pivot bar and including locking projections for urging said locking projections into locking relationship with the device to hold it from movement when said second operating arm is in said first position and for moving said locking projections out of locking relationship with the device to allow normal movement thereof when said second operating arm is moved to said second position; and (j) second spring bias means operably connected to urge said second operating arm towards said second position.

14. The assembly of claim 13 and additionally comprising;

a second operating arm carried by the other end of said first pivot bar at right angles thereto and disposed so as to pivot in a plane close adjacent and parallel to the side of the device at said other end between a first position lying along the adjacent support and a second position angularly disposed with respect to said support.

15. The assembly of claim 13 wherein:

said means for releasably holding said operating arm in said first position comprises a bolt threadably inserted into a tab carried by the adjacent support and positioned such that with said operating arm disposed against said support and said bolt threaded into said tab said operating arm is trapped between said support and said bolt.

16. The assembly of claim 13 and additionally comprising:

(a) a third pivot bar pivotally mounted to the lower support spaced from said second pivot bar and extending perpendicular to and between the sides of the device;

(b) third locking means carried by said third pivot bar and including locking projections for urging said locking projections into locking relationship with the device to hold it from movement when said second operating arm is in said first position and for moving said locking projections out of locking relationship with the device to allow normal movement thereof when said second operating arm is in said first position and for moving said locking projections out of locking relationship with the device to allow normal movement thereof when said second operating arm is moved to said second position; and, (c) connecting means operably interconnecting said second and third locking means whereby to have them move in combination.

17. The assembly of claim 16 wherein:

said first, second and third locking projections each include horizontal stablizing bars for engaging mating slots provided in the device therefor.

* * * * *

UNITED STATES PATENT AND TRADEMARK OFFICE
CERTIFICATE OF CORRECTION

PATENT NO. : 4,749,164
DATED : June 7, 1988
INVENTOR(S) : Cosmo L. LEO and Stanley W. STEFANICK It is certified that error appears in the above—identified patent and that said Letters Patent is hereby corrected as shown below:

Claim 16, Column 10, Lines 20 to 23, delete the phrase "is in said first position and for moving said locking projections out of locking relationship with the device to allow normal movement thereof when said second operating arm".

Signed and Sealed this

Eighth Day of November, 1988

*Attest:*

DONALD J. QUIGG

*Attesting Officer*  *Commissioner of Patents and Trademarks*